Patented Apr. 17, 1951

2,548,980

UNITED STATES PATENT OFFICE 2,548,980

PRESSURE-SENSITIVE ADHESIVE TAPE

Waldo Kellgren, West St. Paul, Minn., assignor to Minnesota Mining & Manufacturing Company, St. Paul, Minn., a corporation of Delaware No Drawing. Application February 1, 1946, Serial No. 645,007

1 Claim. (Cl. 117—68.5)

This invention relates to a unified fibrous base pressure-sensitive adhesive sheet material of the nature of masking tape, having a firmly bonded non-thermoplastic and solvent-proof backsizing comprising a plasticized amino-aldehyde resin.

This application is a continuation-in-part of my application filed February 9, 1945, Serial No. 577,141 (now abandoned).

Pressure-sensitive adhesive tapes as used for the spray masking of automobiles or for various other purposes have ordinarily consisted of an unwoven fibrous sheet material, impregnated and unified with a tough but flexible organic impregnant, and coated with a normally tacky pressure-sensitive adhesive. A priming coat is sometimes interposed between adhesive and backing to provide for improved bonding of the adhesive to the face side of the backing. A backsizing coat is also normally applied on the reverse side of the backing in order to prevent excessive adhesion of the pressure-sensitive adhesive thereto when the tape is wound up in roll form. A typical masking tape construction, such as is shown in the R. G. Drew Patent No. 2,236,527, consists of a porous paper unified with a fluxed blend of broken-down rubber, rosin, and zinc oxide, coated with a rubber base pressure-sensitive adhesive, and backsized with shellac.

As a backsize coating, shellac has many advantages. It is readily applied in the form of a solution in alcohol, and bonds well to many different types of unified backings. It provides a surface to which the usual pressure-sensitive adhesive has but limited adhesion, thereby making possible the unwinding of the tape from roll form without picking or transfer of adhesive and with desirably low removal effort. However, the shellac backsize remains soluble in alcohol and certain other solvents, and is thermoplastic.

Other prior art backsizes have likewise been found to possess these or other disadvantages. For example, some are water-soluble or hygroscopic. Some do not remain firmly bonded to certain unified fibrous backings, particularly those backings having somewhat increased stretch and/or elasticity. Some are, or become, brittle. Others are affected by some or all of the constituents of the pressure-sensitive adhesive or of the backing treatment, with resultant change of properties.

The backsize material should be of such character that the adhesive will be readily removable therefrom, as in unwinding the tape from roll form. At the same time, there should be a reasonably high degree of temporary adhesion between adhesive and backsize. Thus, in masking curved or irregular areas with relatively narrow strips of pressure-sensitive adhesive tape, it is frequently necessary to place a second strip of tape in stretched condition at least partially overlying a first strip. If the adhesion value of the second strip to the back surface of the first strip be too low, it will be found that the second strip will soon pull away under its own tension and destroy the effectiveness of the mask. On the other hand, too high an adhesion value of adhesive to back surface will result in excessively high unwinding effort, which in turn will result in permanent deformation or even breakage of the tape when being unwound from the roll.

Determination of the unwind value of the tape when in roll form is a convenient method of determining the suitability of a particular backsize material. This value must lie within rather narrow limits in order to ensure optimum performance of the product as a masking tape. The plasticized amino-aldehyde resin backsizes of my invention have been found to provide a back surface to which pressure-sensitive adhesives adhere within the desired limits expressed in terms of unwind value.

The adhesion value of the adhesive coating to various other surfaces must also be sufficiently high to hold the tape in place under the moderate tension provided by its own backing, for example when the tape is applied in an irregular or curved pattern on an automobile panel. For any specific unified fibrous backing, however, there exists a limiting value of adhesion. Beyond this value the tape will split or tear when removed from a surface. For use on lacquered or painted panels or the like there exists a further limitation; the removal force required for removal of the tape must be low enough so that there is no danger of stripping away the lacquer or paint film from the underlying panel.

It will furthermore be recognized that the true adhesion value of an adhesive coating may be temporarily or permanently altered by a surface film. For example, a fibrous backing may be unified with an impregnant containing an oily material, and coated with a pressure-sensitive adhesive. Such a tape will not at first adhere to its own backing when applied as an over-lapping strip, because of the intermediate film of oil. However, when wound up and allowed to remain in roll form for some time, the oily surface film may be re-absorbed by the backing, or taken up by the adhesive. In either case, the adhesive then becomes firmly bonded to the back surface, resulting in an extremely high unwind value.

Adhesion value here represents the removal effort in ounces per inch width from a metal surface at 80° F., and is determined as follows: Lay a strip of one-inch width tape, adhesive side down, on a clean polished steel panel. Press the strip into adhesive contact with the panel by passing a hard rubber roller weighing 4.5 lbs. once over the strip at a rate of 7.5 feet per minute. Fasten the far end of the strip to a suitable scale, and move the steel plate away from the scale at a rate of 7.5 feet per minute and so that the portion of the tape removed comes back adjacent but not quite touching the portion still adherently attached. Read the adhesion value in ounces.

Unwind value as herein defined is reported in ounces per inch width, measured at 80° F., and is determined as follows: Place a roll of one-inch width tape, wound on a 3-inch diameter core to an outside diameter of 4 to 6 inches, on a close fitting free-running spindle. Attach the free end of the tape to a suitable scale, and move the spindle, with the freely revolving roll, away from the scale at a constant speed of 7.5 feet per minute. Read the unwind value in ounces.

Pressure-sensitive adhesive tapes made according to my invention, and using widely different unifying agents for the fibrous base sheet and widely different pressure-sensitive adhesives, have been found to be easily unwound from roll form without breaking, tearing, or delamination of the fibrous backing, and without transferring of the backsize from the surface of the backing to the surface of the pressure-sensitive adhesive. The tapes adhere well to various surfaces such as steel, glass, lacquered or varnished surfaces, and the like, and also to their own backings, yet can be stripped away from such surfaces without difficulty. The back surface of the tape is not softened nor appreciably penetrated by water or organic solvents, nor is it softened or made sticky by heat.

These and other advantages are found to result from the use, in conjunction with properly unified fibrous backings and properly adherent and eucohesive pressure-sensitive adhesives, of a particular type of backsizing composition applied to the backing member in a particular way, as illustrated by the following specific examples. The backsizing composition which I employ in obtaining the above desirable combination of properties comprises a plasticized alcohol-soluble heat-advancing amino-aldehyde resin. This composition is applied to the impregnated fibrous sheet material and is then further reacted to the insoluble state whereupon it is found to be firmly bonded in place.

*Example 1*

A "Duracel" crepe paper, a purified kraft towelling type of paper sold by Brown Co., Berlin, N. H., was used as the fibrous base sheet. The paper had a ream weight of 27 lbs. (weight of 320 square yards), a lengthwise tensile strength of 5.5–6.5 lbs. per half inch width, and a porosity value of 6–7 seconds (Gurley Densometer, 400 cc., 2 thicknesses).

The paper was treated with a total of from 12 to 16 grains per 24 square inches of heat-reactive unifying composition, applied from solution in xylol by means of squeeze rolls. This amount was sufficient to impregnate the paper thoroughly without leaving any excessive amount on the surface. Two successive applications of the solution, with removal of solvent after each application, were required. The impregnated paper was heated for 10 hours at 185° F.

The unifying composition consisted of a mixture of 62 parts of alkyd resin, 3 parts of zinc oxide, 3 parts of dipentamethylene thiuram tetrasulfide, and 2.5 parts of heat-reactive alcohol-soluble urea-formaldehyde-butanol resin. The alkyd resin was a highly viscous, sticky, elastic xylol-soluble material obtained by heating together ethylene glycol, glycerine, castor oil, and an acidic addition product of a terpene and maleic anhydride.

The backing at this stage was not thoroughly unified. The impregnant was not completely cured; it was still slightly sticky and soft at elevated temperatures, and was softened and partially dissolved by lacquer solvents. A portion was coated with pressure-sensitive adhesive. Narrow strips of the coated material were found to pull away from the back surfaces of similar strips to which they had been adhesively attached in overlapping relationship and in curved patterns. Such strips after subsequent pressure application to clean glass surfaces were found to be removable under extremely light tension, and to leave a microscopic film of an oily material on the glass. However, the strips when wound in roll form were found to become soon bonded together to such an extent that an attempt to unwind the roll resulted in disfigurement or actual breakage of the coated sheet material.

To the impregnated backing was then applied a light coating of a backsizing composition consisting of three parts of heat-reactive alcohol-soluble amino-aldehyde resin and one part of alkyd resin plasticizer, applied from solution in a mixture of xylol and butanol. The amino-aldehyde resin used was "Uformite F–200–E," which is obtained as a 50% solution in 50:50 butanol-xylol solvent mixture of an alcohol-soluble, heat-reactive amino-aldehyde resin, and is sold by Resinous Products and Chemicals Corp. The alkyd resin was "Paraplex AL–16," sold by Resinous Products and Chemicals Corp. in the form of a 70% solution in xylol, and is a non-oxidizing alkyd type resin containing castor oil. Two grains of non-volatile material were applied per 24 square inches. The sized backing was then hung up in an oven at 250° F. for about 10 minutes, in order to set up the backsize to an alcohol-insoluble and tough state and with a high degree of anchorage to the impregnated backing, and also to advance the impregnant to a non-sticky and non-oily state.

The face side of the completed backing was next coated with a reclaim rubber-rosin-zinc oxide adhesive primer composition (see "Primer No. 4" of R. G. Drew Patent No. 2,236,567), and subsequently with a normally tacky and pressure-sensitive adhesive having a polyisobutylene-polyterpene resin base. When slit into narrow widths and wound up on its own backing in roll form, the resulting product was found to have a proper balance of adhesion value, unwind value, fiber unification, etc., and to be well suited for use as a masking tape.

Heat-reactive alcohol-soluble amino-aldehyde resins suitable for use in my backsizing compositions may be prepared by reacting together an aldehyde (usually, though not necessarily, formaldehyde), an amino compound such as urea, thiourea, melamine, or the like, and a monohydric alcohol such as n-butyl or isobutyl alcohol. The reaction may be carried out in a single operation or stepwise, as by a partial reaction of urea and formaldehyde followed by reaction with n-butyl alcohol. In a specific example, 1000 parts of 37% formaldehyde solution is brought to a pH of 7–8 by the addition of ammonium hydroxide. To this is added 240 parts of urea, and the mixture is heated at 85° C. for 50-55 minutes or until the urea is all dissolved. Under reduced pressure, the temperature is allowed to drop to 55-60° C., whereupon 592 parts of n-butyl alcohol, 60 parts of xylol, and 6 parts of phosphoric acid (catalyst) are added. The temperature is maintained while water, together with a portion of the solvent, is removed. The reaction is terminated while the resin is still alcohol-soluble and heat-reactive. The final solution is diluted with n-butyl alcohol to approximately 50% concentration.

An alkyd resin which may be used as a plasticizer or modifier in conjunction with these amino-aldehyde resins in place of "Paraplex AL-16" may be prepared by heating together 2000 parts of phthalic anhydride, 600 parts of ethylene glycol, 300 parts of glycerine, and 2000 parts of castor oil. Heating is continued, with constant stirring, to a degree such that the viscosity at 80° F. of a 70% solution in xylol is approximately 200 centipoises.

A viscous alkyd resin prepared in a similar way from 400 parts of phthalic anhydride, 200 parts of ethylene glycol, and 400 parts of castor oil, has also been used. Another suitable resin may be prepared from glycerine, ethylene glycol and sebacic acid. Other compatible, high molecular weight, non-volatile alkyd resins, or heavy bodied hydroxylated oils such as heavy bodied castor oil, which are soluble in xylol, are found to be well suited for use with alcohol-soluble heat-reactive amino-aldehyde resins in my backsizing compositions.

It has also been found that certain self-plasticized amino-aldehyde resins may be employed, without the addition of an alkyd resin or other modifier. For example, an alcohol-soluble heat-reactive urea-formaldehyde-capryl alcohol resin was applied to the impregnated backing from solution in xylol and at a coating weight of 2.5 grains per 24 square inches. After curing for 15 minutes at 250° F., the backsize was found to be firmly anchored to the backing, adequately tough and flexible, and properly inactive toward the pressure-sensitive adhesive of coated tape constructions produced therewith.

Compatible film-forming high-polymers such as ethyl cellulose, or preferably polyvinyl butyral, may be added to the plasticized amino-aldehyde backsize compositions. Pigments or dyes, fillers, and other modifying agents may also be added so long as they do not adversely affect the required properties already indicated.

*Example 2*

Twenty-seven lb. "Duracel" crepe paper was impregnated with 15-18 grains per 24 square inches of a vulcanizable synthetic rubber composition, applied from solution in a volatile hydrocarbon solvent. The resulting impregnated backing was heated for 10 hours at 185° F. It was then backsized with about 2 grains of the backsizing composition described in Example 1, and heated further for 15 minutes at 250° F. The backing was primed with the primer composition of Example 1, and coated with a reclaim rubber-polyterpene resin base pressure-sensitive adhesive. The resulting coated material was highly satisfactory for use as a masking tape.

Natural rubber is readily broken down to a plastic or fluid state by prolonged mastication in the presence of oxygen. Peptizing agents, such as certain mercaptans, accelerate this breakdown. Rubbery butadiene-styrene synthetic copolymers, such as GR-S rubber, are found to be quite resistant to such action, and, so far as I am aware, have not previously been reduced to a viscosity suitable for the impregnation of fibrous backings of the nature of paper. I have now found that the addition of certain auxiliary modifying agents to the GR-S, together with proper peptizing agents, makes possible the mechanical breakdown of the polymer to a fluid or plastic state and its subsequent effective use in the impregnation and unification of absorbent paper and other fibrous sheet materials. Para-hydroxy-phenyl-morpholine, obtainable under the trade-mark "Solux," is such a modifying agent.

In this example, the impregnating composition was prepared as follows: One hundred parts of "GRS" synthetic rubber (butadiene-styrene copolymer), 100 parts of zinc oxide, 4 parts of p-hydroxy-phenyl-morpholine, and 8 parts of zinc xylyl mercaptan were mixed in a heated heavy-duty internal mixer until quite fluid, which required 2 hours when the mixer was heated with steam at 80 p. s. i. This mixture was cooled, and 100 parts of gum rosin and 60 parts of polyterpene resin melting at 25° C. were added; after mixing was complete, the mass was dissolved in oleum spirits. At room temperature and at a solvent content of 36-41%, such solutions have a viscosity of about 1000-5000 centipoises. Just prior to use, there was added to the above solution a mixture of 4 parts of dipentamethylene thiuram tetrasulfide and 12 parts of an alkyl phenol sulfide ("Vultac No. 3," sold by Sharples Chemicals Inc.), dispersed in a small amount of oleum spirits.

Para-hydroxy-phenyl-morpholine is commonly known in rubber technology as an antioxidant. However, it appears to exert a specific effect, when used in the above formula, which is not obtained with other known antioxidants. Thus the substitution of a mixture of phenyl-alpha-naphthylamine and diphenyl-para-phenylene-diamine (Akroflex C) in the formula did not provide an equivalent breakdown of the synthetic rubber, while the use of an acetone-aniline condensation product (such as Flectol H) caused an actual increase in the final viscosity of the batch over that obtained with the peptizing agent alone.

Rapid reduction of the polymer to a suitably low viscosity was obtained by using 8 parts of zinc xylyl mercaptain as the peptizing agent as indicated in the formula. Twelve parts of this agent was even more effective, but the gain in effectiveness was not sufficient to warrant the increased cost. Four parts appeared to be a minimum below which a satisfactory impregnating viscosity could not be obtained at any reasonable solvent concentration. Phenyl hydrazine could be substituted for the zinc xlyly mercaptan in the higher percentages, or could desirably be combined therewith. For example, a mixture of 6 parts phenyl hydrazine and one part zinc xylyl mercaptan was found to give adequate breakdown together with reduced sulfur content.

A wide variety of resins may be used in these impregnating and unifying compositions. The resins, or mixture of resins, must be sufficiently soft to provide a flexible backing, must be compatible with the synthetic rubber both before and after vulcanization so as to form a homogeneous blend, and should improve the cementing together of the paper fibers. If no resin is used, the paper fibers may be encased in rubber but are not ordinarily sufficiently firmly bonded or cemented thereto. The resin should also be water-insoluble so that the unified paper will be resistant to moisture and water and will be non-hygroscopic. Resins which either individually or in blends have been found to fulfill these requirements include rosin, ester gum, polymerized rosin, zinc resinate, limed rosin, hydrogenated rosin, pentaerythritol abietate; coumarone-indene resins and hydrogenated coumarone-indene resins; and terpene resins of various softening points. The blend of gum rosin and soft polyterpene resin shown in the example may be replaced, for example, with a somewhat softer blend of gum rosin and a liquid terpene resin such as "Piccolyte S Liquid."

Vulcanization of the synthetic rubber-resin impregnating composition may conveniently be carried out by means of self-vulcanizing sulfur-containing organic accelerators such as the thiuram polysulfide type, or by means of oil-soluble heat- and oil-reactive phenol-aldehyde resins, or in other ways. The thiuram polysulfides, such as pentamethylene-thiuram-tetrasulfide or tetramethyl-thiuram-disulfide, or any equivalent self-vulcanizing agents, provide adequate vulcanization of the broken-down synthetic rubber even in the presence of rosin and paper fibers, and under time-temperature combinations which do not adversely affect the finished backing. Where these polysulfide materials are used alone, a somewhat increased amount is necessary; but where additional vulcanizing materials are used, such as the alkyl phenol sulfide of the example, the amount of polysulfide may be reduced while still obtaining a favorable rate of vulcanization.

In this example, the backsize composition was applied from solution in xylol and butanol. For somewhat more rapid operation, a more volatile solvent such as ethyl alcohol may be used to replace most of the butanol, and the backsized sheet may be heated at a higher temperature, for example, for 3 to 5 minutes at 350° F. A suitable backsize solution employing ethyl alcohol in the solvent mixture and having a somewhat increased ratio of amino-aldehyde-alcohol resin to alkyd resin may consist of 28 parts of "Uformite F-200-E" solution, 5 parts of "Paraplex AL-16" solution, and 8 parts of ethyl alcohol.

Prior to the application of the backsize and the subsequent heat-curing operation, the impregnated backing is found to be inadequately unified. The additional heating at temperatures of about 250° F.–350° F. apparently not only sets up the backsize, but also causes a further vulcanization of the impregnant, and brings about an increase in the bond between the backsize and the impregnated base sheet. Vulcanization of the base sheet to this advanced stage prior to backsizing has been found to result in a brittle and weak final product from which portions of the backsize coating may be removed during unwinding of adhesive-coated tape rolls made therefrom. This same difficulty is experienced with various other backsize materials, such as shellac, nitrocellulose or the like, whether applied to the GR-S treated backing in partially vulcanized condition or after complete curing, but is avoided by my improved procedure involving application of the heat-curing backsize to the incompletely cured backing followed by heating.

In the above example, an adhesive primer was indicated, for improved bonding between the adhesive coating and the face side of the treated backing. In the application of the backsize solution, some penetration through the treated and incompletely cured backing infrequently occurs; the primer coating acts as insurance against the adhesive offsetting which would otherwise be anticipated at such areas. In general, however, an adhesive primer is not required on backings of the type shown in Example 2.

*Example 3*

In this example, a flexible fibrous sheet was impregnated with a vulcanizable unifying composition made from reclaim rubber, zinc oxide, rosin, coumarone-indene resin, and a vulcanizing agent. After preliminary heating and partial vulcanizing, separate portions of the backing were backsized with mixtures of the amino-aldehyde resin and alkyd resin used in Example 1, in various proportions. The backings were then further heated and were converted to pressure-sensitive adhesive tape and tested for utility as masking tape. Good results were obtained with as high as 90 parts and as low as 15 parts of the alkyd resin in 100 parts of the composition. With 90 parts of alkyd resin and 10 parts of amino-aldehyde resin, a curing period of 2 hours at 250° F. was required in order to insolubilize the backsize and render it inactive to the pressure-sensitive adhesives. At higher temperatures, less curing time is required. Embrittling of cellulose fibers, or overcuring of the impregnant or backsize, is, however, to be avoided. At 10 parts alkyd resin and 90 parts amino-aldehyde resin, the backsize was somewhat less flexible than would be desired for best results. Ratios of approximately 1:3, as shown in Example 1, were found to be most satisfactory, all things considered, when using the specific resins there employed.

Slow removal of tape from roll form, as in the unwind test, places a minimum strain on the bond between backsize and unified backing. A much more severe strain is placed on this bond when the roll is unwound rapidly, as by jerking the free end of the tape so as to remove a strip of tape one to three feet in length while suspending the roll from the core. Under such conditions, it is found that many previously used backsize materials are partly or completely removed from the unified backing and remain adhesively attached to the adhesive surface. The extent of this removal may be estimated by measuring the adhesion value of strips of tape removed under conditions of slow and fast unwind.

Tape that has been freshly prepared and recently made up in loosely wound roll form will normally give minimum unwind values. After the tape is in roll form for some time, perhaps because of slow equalization of stresses in the backing, or because of changes in atmospheric conditions, or due to the slow deformation of the pressure-sensitive adhesive under stress, or for other reasons, the unwind value ordinarily increases, in many cases accompanied by an increase in the adhesion value. With previously backsize materials, such changes frequently have upset the proper balance of unwinding values and have resulted in tearing or splitting of the backing, detachment of the backsize, transfer or splitting of the adhesive, or annoyingly difficult unwinding of the roll of tape when in use. In order to forecast, and thus to avoid, such causes of failure, it has been found useful to heat the rolls in an oven for 16 hours at 150° F., and re-test for adhesion and unwind values. Although a wide latitude of values is permissible when considering the manifold types of tapes and the uses to which the various types may be put, and the widely different conditions under which they may be used, it has nevertheless been found that, for most tapes designed for masking purposes, as in masking automobiles during spray finishing thereof, an adhesion value of from about 20 to about 40 ounces per inch width after removal from the roll, and an unwind value of from about 15 to about 45 ounces per inch width, is desirable.

As will be apparent from the foregoing, a proper balance of unwinding values will include: a sufficiently firm and strong bond between backsize and unified backing so that the backsize will remain in its intended position on the backing during removal of the tape from roll form; a sufficiently low adhesion value between pressure-sensitive adhesive and backsize so that the tape may be easily unwound by hand from roll form without undue stretching, or tearing, of the tape, or delamination or splitting of the unified backing or offsetting of the adhesive under abnormally severe unwinding conditions, such as high speed or jerky unwinding; and, conversely, a sufficiently high temporary adhesion of adhesive surface to back surface as well as to the various types of surfaces to which the tape is later to be applied, so that the tape may be applied under moderate tension, as on irregular or curved outlines, and in superimposed multiple layers, without lifting or falling away under the moderate but continuous forces thereby imposed, or under the additional forces involved during brushing or spraying operations or the like.

Pressure-sensitive adhesive tapes prepared according to the examples were tested for adhesion and unwind values in accordance with the above. The tape of Example 1, removed from a freshly prepared roll, had an unwind value of 26 ounces, and an adhesion value of 30 ounces. The adhesion value was the same independent of the rate of removal of the tape from the roll, showing that the backsize was firmly bonded to the unified backing. The tape of Example 2 had an initial unwind of 24 ounces, which increased to 36 ounces on artificially aging the roll (16 hours at 150° F.). The initial adhesion values on tape removed at slow and at fast rates of unwind were 26 and 24 ounces, respectively; after artificial aging of the roll, these values were 32 and 33 ounces. Similarly, the tape of Example 3, using the backsize of Example 1, gave an initial unwind value of 36 and a value after aging of 40 ounces. The initial adhesion values on slow and fast unwind were 33 and 30 ounces; after aging, these values were 42 and 37 ounces.

As a comparison, a sample of masking tape in which the fibrous backing was unified with a vulcanized synthetic rubber composition and backsized with shellac was tested in a similar manner. During the drying of the shellac coating, which was applied as an alcoholic solution, it was noted that the shellac, even when completely dry, softened and adhered to heated metal rollers and bars with which it came in contact in the drying chamber. This is in contrast to the action of the plasticized amino-aldehyde resin backsize, which on heating quickly sets up to a non-thermoplastic and easily handled state.

The shellac-backsized tape as first prepared had an adhesion value of 12 ounces when unwound slowly, and 14 ounces when unwound rapidly. After only four months shelf life, the corresponding values were 42 ounces and 18 ounces, respectively. The extreme difference between these two latter values is an indication that, under the additional stress of rapid unwinding of the tape, the shellac backsize was pulled away from the unified backing and remained as a mask or covering layer on the surface of the pressure-sensitive adhesive.

When my plasticized amino-aldehyde resin composition replaced the shellac backsize of the above tape, the corresponding adhesion values were 27 and 26 ounces on the fresh material, and 48 and 46 ounces after four months. The backsize remained firmly bonded to the unified backing even during rapid unwinding of the tape.

Similar tests have been conducted, and similar results obtained, with a wide variety of impregnating and unifying compositions, of which three specific examples have been given. The impregnating and unifying composition may be applied from aqueous dispersion as well as from organic solution. Both flat and creped paper, as well as other fibrous base sheet materials, have been employed. Pressure-sensitive adhesives having the required adhesion value, eucohesive properties, resistance to deterioration on aging, and other required properties have been found generally satisfactory; thus polyisobutylene, natural rubber, reclaim rubber, synthetic rubber and synthetic resin base pressure-sensitive adhesives have all been used.

Having now described my invention and set forth various examples for purposes of illustration rather than limitation, what I claim is as follows:

A pressure-sensitive adhesive tape wound upon itself in roll form and comprising a flexible unified fibrous sheet backing, a normally and aggressively tacky water-insoluble pressure-sensitive rubbery base adhesive coating firmly united to one side of the backing, and a thin flexible non-tacky alcohol-insoluble non-thermoplastic resin backsizing coating firmly united to the other side of the backing; said backsizing essentially consisting of a resin reaction product of urea, formaldehyde and butyl alcohol, blended with a castor oil-modified alkyd resin plasticizer which is present in a proportion of the order of one part to each three parts of said urea-formaldehyde-alcohol type resin; said backsizing having been heat-advanced in situ from an alcohol-soluble stage to an alcohol-insoluble non-thermoplastic state, and being inactive to the tacky adhesive to a degree permitting easy unwinding of the tape without delamination or offsetting of adhesive.

WALDO KELLGREN.

REFERENCES CITED

The following references are of record in the file of this patent:

UNITED STATES PATENTS

| Number | Name | Date |
| --- | --- | --- |
| 2,147,772 | Kallander | Feb. 21, 1939 |
| 2,201,892 | Edgar et al. | May 21, 1940 |
| 2,236,527 | Drew | Apr. 1, 1941 |

FOREIGN PATENTS

| Number | Country | Date |
| --- | --- | --- |
| 388,556 | Great Britain | Mar. 2, 1933 |